United States Patent [19]
Giunta et al.

[11] 3,900,065
[45] Aug. 19, 1975

[54] FLUX FEEDING METHOD AND APPARATUS

[75] Inventors: Joseph S. Giunta, Monroeville; Louis G. Lazzaretti, Ambridge, both of Pa.

[73] Assignee: United States Steel Corporation, Pittsburgh, Pa.

[22] Filed: May 17, 1973

[21] Appl. No.: 361,363

[52] U.S. Cl............................... 164/273 R; 164/281
[51] Int. Cl............................................... B22d 11/00
[58] Field of Search ........... 164/273 M, 273 R, 281, 164/82, 52, 252, 273

[56] References Cited
UNITED STATES PATENTS

| | | | |
|---|---|---|---|
| 2,370,467 | 2/1945 | Hopkins | 164/52 |
| 3,511,303 | 5/1970 | Parsons | 164/252 |

FOREIGN PATENTS OR APPLICATIONS

| | | | |
|---|---|---|---|
| 1,158,403 | 7/1969 | United Kingdom | 164/281 |

*Primary Examiner*—Francis S. Husar
*Assistant Examiner*—V. K. Rising
*Attorney, Agent, or Firm*—Walter P. Wood

[57] ABSTRACT

A method and apparatus for feeding flux to the molds of a continuous-casting machine. The apparatus includes a portable carriage on which are mounted one or more gas-tight bins for containing powdered flux, and feeding devices (e.g. screw feeders) under the respective bins. The feeding devices deliver flux from the bins to junction devices (e.g. inverted tees). Gas, preferably inert, is introduced both to the junction devices and to the bins. The gas introduced to the junction devices delivers the flux to the molds via tubing which extends from these devices to the respective molds, while the gas introduced to the bins assures that flux flows smoothly by gravity from the bins into the feeding devices.

6 Claims, 6 Drawing Figures

FLUX FEEDING METHOD AND APPARATUS

This invention relates to an improved method and apparatus for feeding flux to the molds of a continuous-casting machine.

In a conventional continuous-casting operation, liquid metal is teemed continuously into the upper end of an open-ended, water cooled, vertically oscillating mold. A casting, which at this stage has only a thin solidified outer skin and a liquid core, emerges continuously from the lower end of the mold. A powdered flux may be added to the upper end of the mold in small carefully regulated quantities. The flux melts and covers the surface of the pool of liquid metal in the mold, and also may form a protective and lubricating layer between the solidifying skin of the casting and the mold wall. Heretofore the most common practice has been to add flux manually to the mold, as with a scoop, although mechanical flux feeders are known, as shown, for example, in Astrov et al U.S. Pat. No. 3,411,566 or Theisen U.S. Pat. No. 3,669,178. The former constitutes the closest prior art to our invention of which we are aware.

Another object of our invention is to provide an improved flux feeding method and apparatus with which we accurately regulate the quantity of flux fed to a mold, yet employ an apparatus easily moved out of the way when not needed.

A further object is to provide an improved flux feeding apparatus which is portable and sufficiently remote from a continuous-casting pouring stream and mold that it does not crowd the area of a casting floor near the mold.

A further object is to provide an improved flux feeding apparatus which can service a plurality of parallel molds.

A further object is to provide an improved baffle construction for distributing flux from the feeding apparatus uniformly across a mold.

Figure 1:
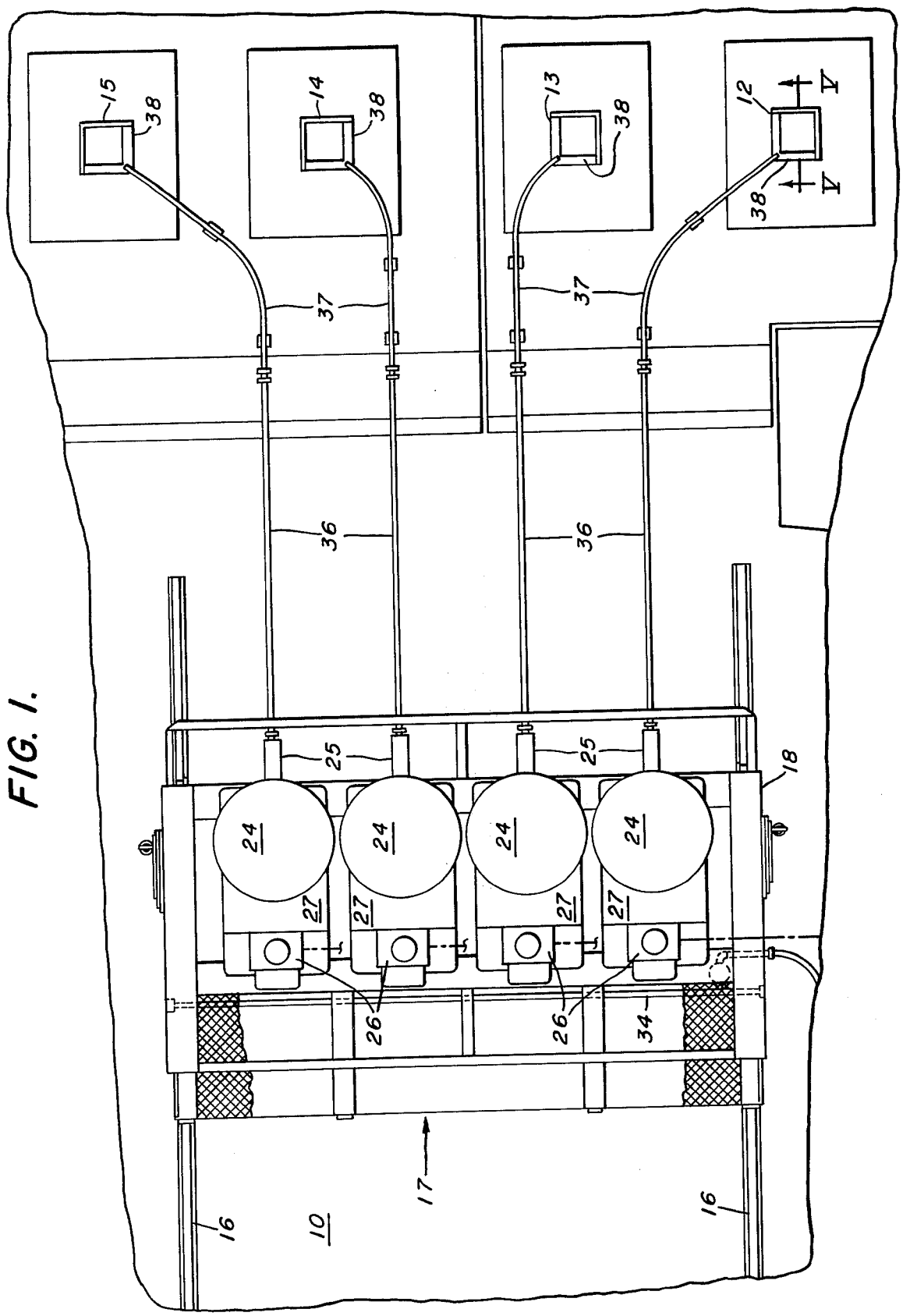
FIG. 1 is a top plan view of our flux-feeding apparatus in its operating position on a casting floor.
Figure 2:
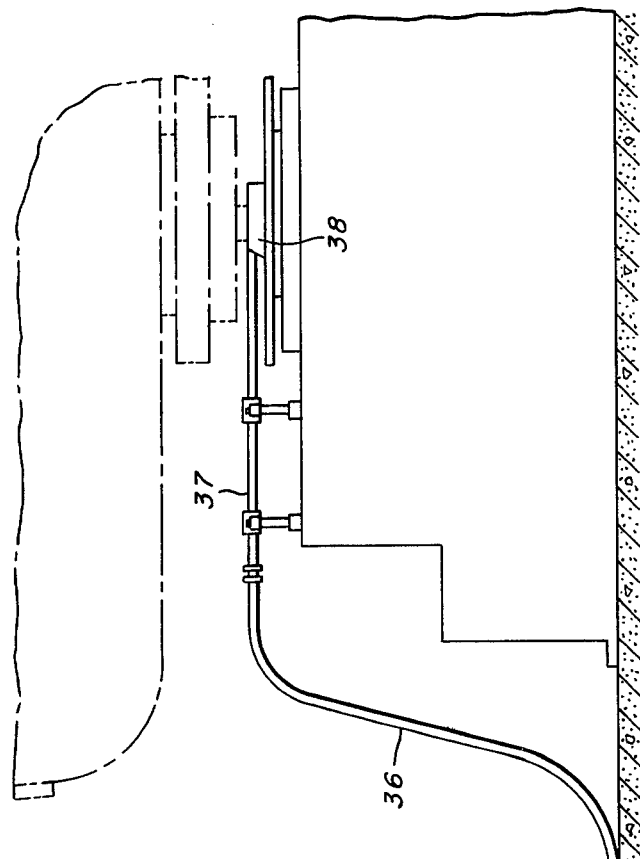
FIG. 2 is a side elevational view of the apparatus with parts broken away.

FIGS. 1 and 2 show a portion of a casting floor 10 of a structure in which a multi-strand continous-casting machine is housed. Four parallel rectangular molds of the casting machine are indicated diagrammatically at 12, 13, 14 and 15. The floor carries spaced-apart rails 16 on which our flux-feeding apparatus 17 is mounted for movement toward and away from the molds. The flux-feeding apparatus includes a carriage 18 and wheels 19 riding on said rails. A hand brake mechanism 20 is mounted on the carriage and is cooperable with at least one of the wheels for holding the apparatus in a fixed position.

The apparatus includes one or more bins 23 mounted on carriage 18 and corresponding in number with the number of molds which the apparatus is to serve, four in the illustration. Each bin has a respective removable gas-tight cover 24, and encloses a supply of powdered flux F to be delivered to the molds. The bins have sufficient capacity that there is no need to open them to add flux any time during a casting operation. Each bin has a respective feeding device 25 therebelow for withdrawing flux from the bin at a controlled volumetric rate. We have illustrated each feeding device as a screw feeder (shown disproportionately larger in FIG. 2 for clarity) and a drive motor 26 operatively connected therewith, but we may use other devices, such as a vibratory or star feeder. The shaft of each screw feeder has seals, whereby the bin is completely sealed to enable it to be pressurized. Each bin also is equipped with a respective vibrator 27. A suitable assembly of bin, screw feeder, drive motor and vibrator is available commercially, and one or several of these assemblies can be mounted on the carriage. One source is Vibra Screw Feeders, Inc. of Totowa, New Jersey, who supply a suitable assembly as the "¾ inch Live Bin Feeder".

Figure 5:
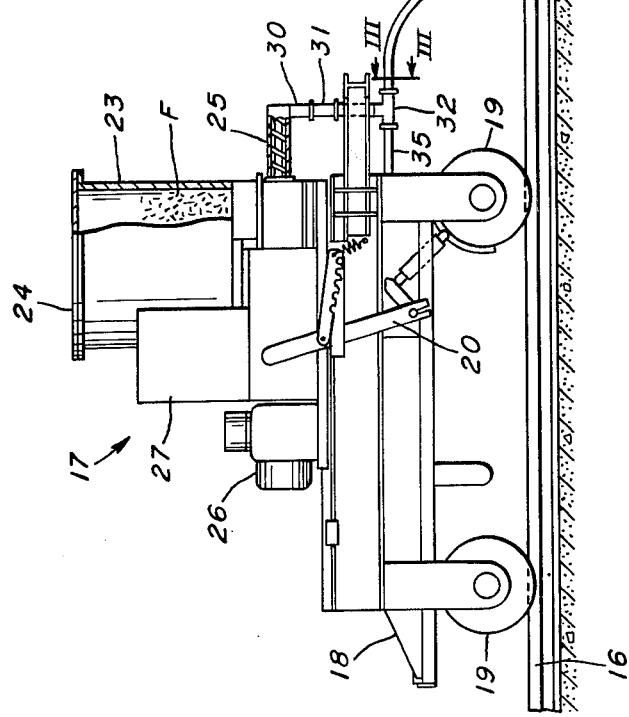
FIG. 5 is a vertical section on line V—V of FIG. 1.
Figure 5:
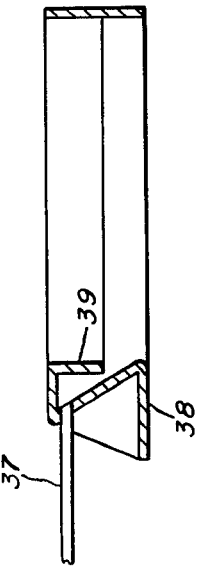
Figure 3:
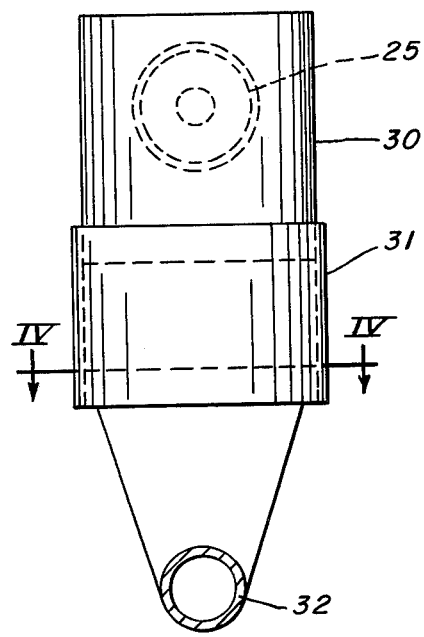
FIG. 3 is a vertical section on a larger scale on line III—III of FIG. 2.
Figure 4:
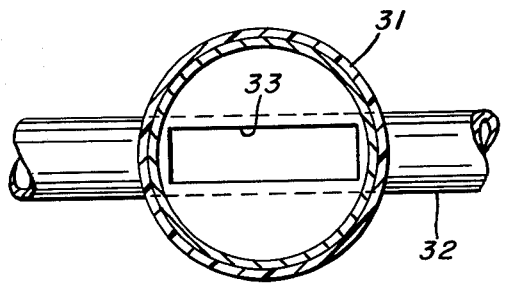
FIG. 4 is a horizontal section on line IV—IV of FIG. 3.
Figure 6:
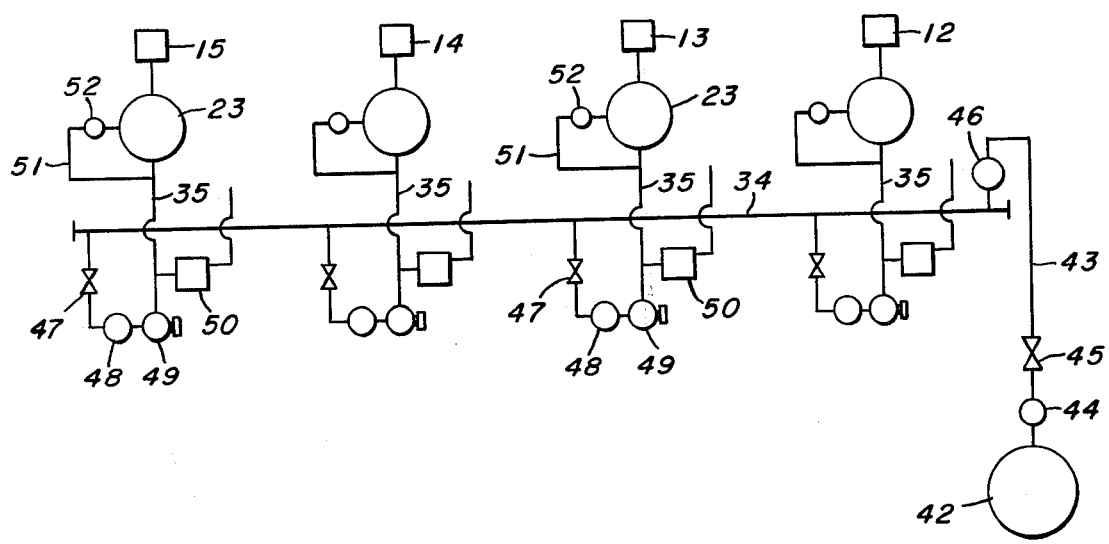
FIG. 6 is a schematic piping diagram of the gas-supply system.

Each feeding device 25 leads to a respective downcomer 30 to which we connect a flexible tube 31. We connect the lower end of each tube 31 to a respective junction device 32. We have illustrated each junction device as an inverted tee, the leg of which is connected to the flexible tube, but equivalents are possible. When a tee is used, the leg may be vertical as illustrated or it may slope toward the molds. As best shown in FIGS. 3 and 4, the leg of each tee 32 illustrated tapers downwardly when viewed in end elevation, and at its lower end has a rectangular outlet 33 into the arms of the tee. The outlet 33 is elongated in the direction of the axis of the arms of the tee. A gas header 34 extends across the rear portion of the carriage 18 and is connected to the junction devices 32 (in the illustration the rearwardly extending arms of the respective tees) through branches 35 (FIG. 6). We connect respective flexible delivery tubes 36 to the junction devices (in the illustration the forwardly extending arms of the tees), and connect the other ends of the flexible tubes to rigid metal delivery tubes 37 which lead to the respective molds 12, 13, 14 and 15. As best shown in FIGS. 1 and 5, the connection between tube 37 and a mold such as 12 includes a baffle 38 of Z-shape in cross-section. The baffle extends along the upper edge of one or more sides of the rectangular mold. The upper flange of the Z carries a depending lip 39. We have illustrated the baffle as L-shape in plan with the rigid tube 37 entering at the corner where the two segments of the L intersect, but the tube may enter at other locations. There is considerable splashing as a stream of liquid metal enters the mold. The lip 39 protects the entrance against becoming plugged by splashing metal or other materials.

FIG. 6 is a schematic piping diagram of the gassupply system. We connect the header 34 to a tank 42 which contains a supply of gas under pressure. The connection includes a flexible hose 43, a high-pressure regulator 44, a manual shut-off valve 45, and a filter 46. Each branch 35 has a respective manual shut-off valve 47, a pressure regulator 48, a flowmeter 49, and a pressure switch 50. We connect the pressure switch with the corresponding motor 26 which drives the feeding device 25. In the event the flux delivery path becomes blocked, the resulting pressure increase actuates the pressure switch to stop the feeding device and thus prevent damage to the parts. Each branch 35 has a respective sub-branch 51 which leads to the corresponding bin 23. Each sub-branch 51 has a respective relief valve 52.

In operation, we position carriage 18 a short distance from the molds 12, 13, 14 and 15 and connect the flexible tubes 36 with the rigid tubes 37. We energize one or more of the motors 26 to drive the corresponding feeding devices 25 and thus deliver powdered flux F from bins 23 to the downcomers 30 corresponding with the molds which are operating and thence to the junction devices 32. During a casting operation all the molds normally operate, but sometimes one may be down for maintenance or repair. When we start the feeding devices, we open valve 45 and the valves 47 corresponding with the operating molds to introduce gas to the junction devices 32 and to the upper portions of the bins 23. We adjust the pressure regulators 48 to provide a gas pressure above atmospheric up to about 5 psig or preferably about 1 to 2 psig. The gas thus introduced to the bins assures a smooth gravity flow or flux from each bin into the corresponding feeding device 25 with a minimum flow of gas. The gas introduced to the junction devices 32 assures that the flux from the downcomers is delivered smoothly through the tubes 36 and 37 to the molds. Our preferred gas is argon, but we may use other inert or relatively inert gases or even air. However, we prefer not to use an oxidizing gas since such gas may adversely affect the liquid metal going into the mold. As pointed out hereinbefore, the baffle 38 is effective to prevent plugging of the flux entrance to the mold, but it has the futher advantage that the sloping web of the Z and the depending lip 39 assure that the flux is distributed uniformly across the liquid metal, particularly in molds of larger cross-sectioned area.

The casting floor adjacent the molds is crowded with other equipment. By making our flux feeding apparatus portable, we can move it away from the molds a sufficient distance that it does not interfere with access to the molds for maintenance. When the apparatus is in its operative position, it is far enough spaced not to interfere with feeding liquid metal to the mold nor to be damaged by proximity to the hot metal. The flexible delivery tubes can fit around equipment otherwise in the way. Conveniently other equipment, such as reels for feeding aluminum wire to the molds, may be mounted on carriage 18 alongside the flux feeders.

We claim:

1. The combination, with a plurality of continuous-casting molds and a casting floor adjacent said molds, of an apparatus for feeding powdered flux to said molds, said apparatus including a corresponding plurality of bins for enclosing supplies of flux, a corresponding plurality of feeding devices for receiving flux from said bins, means for delivering flux from said feeding devices to the respective molds, and means for introducing gas to said flux-delivering means, the improvements in which:

said apparatus comprises a portable carriage on which said bins and said feeding devices are mounted;

said gas-introducing means comprises a header mounted on said carriage, respective branches connecting said header with said flux-delivering means, and respective sub-branches connecting said branches with said bins, said bins being gastight; and said flux-delivering means includes in part a flexible tube.

2. A combination as defined in claim 1 in which said feeding devices are screw feeders.

3. The combination, with a continuous-casting mold and a casting floor adjacent said mold, of an apparatus for feeding powdered flux to said mold, said apparatus including a bin for enclosing a supply of flux, a feeding device for receiving flux from said bin, means for delivering flux from said feeding device to said mold, and means for introducing gas to said flux-delivering means, the improvements in which:

said apparatus comprises a portable carriage on which said bin, said feeding device, and said gas-introducing means are mounted; said bin being gastight and connected with said gas-introducing means; and said flux-delivering means includes a downcomer for receiving flux from said feeding device, a flexible tube connected to said downcomer, a junction device connected to said flexible tube and to said gas-introducing means, and another flexible tube connected to said junction device and extending toward said mold.

4. A combination as defined in claim 3 in which said junction device is an inverted tee having a leg connected to said first-named flexible tube and arms connected respectively to said gas-introducing means and to said last-named flexible tube.

5. A combination as defined in claim 4 in which the leg of said tee tapers downwardly and has a rectangular outlet into the arms of said tee, said outlet being elongated in the direction of the axis of said arms.

6. The combination, with a continuous-casting mold and a casting floor adjacent said mold, of an apparatus for feeding powdered flux to said mold, said apparatus including a bin for enclosing a supply of flux, a feeding device for receiving flux from said bin, means for delivering flux from said feeding device to said mold, and means for introducing gas to said flux-delivering means, the improvements in which:

said apparatus comprises a portable carriage on which said bin, said feeding device, and said gas-introducing means are mounted, said bin being gastight and connected with said gas-introducing means;

said flux-delivering means includes in part a flexible tube; and said mold includes a baffle of Z-shape in cross section mounted on its top, said baffle having a flux entrance passage and depending lip which prevents the flux entrance to said baffle and mold from becoming plugged.

* * * * *